US012770903B2

(12) United States Patent
Fukami et al.

(10) Patent No.: US 12,770,903 B2
(45) Date of Patent: Oct. 20, 2026

(54) FUEL CELL SYSTEM

(71) Applicant: TOYOTA JIDOSHA KABUSHIKI KAISHA, Toyota (JP)

(72) Inventors: Tatsuya Fukami, Toyota (JP); Kenji Sato, Kasugai (JP); Hiroaki Mori, Ogaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 614 days.

(21) Appl. No.: 18/447,602

(22) Filed: Aug. 10, 2023

(65) Prior Publication Data

US 2024/0072284 A1 Feb. 29, 2024

(30) Foreign Application Priority Data

Aug. 23, 2022 (JP) ................................ 2022-132429

(51) Int. Cl.

*H01M 8/04858* (2016.01)
*B60L 50/51* (2019.01)
*B60L 58/30* (2019.01)

(52) U.S. Cl.

CPC ......... *H01M 8/04947* (2013.01); *B60L 50/51* (2019.02); *B60L 58/30* (2019.02); *H01M 8/0494* (2013.01)

(58) Field of Classification Search

None

See application file for complete search history.

(56) References Cited

U.S. PATENT DOCUMENTS

| | | | | |
|---|---|---|---|---|
| 2002/0062183 | A1* | 5/2002 | Yamaguchi | B60K 6/543 903/905 |
| 2006/0257698 | A1 | 11/2006 | Ishikawa et al. | |
| 2010/0291447 | A1* | 11/2010 | Imanishi | H01M 8/04268 429/429 |
| 2017/0373501 | A1* | 12/2017 | Okamoto | H02J 3/32 |
| 2020/0328441 | A1* | 10/2020 | Fukami | B60L 58/30 |
| 2021/0188102 | A1* | 6/2021 | Ichikawa | B60L 53/50 |
| 2021/0367246 | A1* | 11/2021 | Ogawa | H01M 8/0432 |

FOREIGN PATENT DOCUMENTS

| | | | | |
|---|---|---|---|---|
| EP | 1953857 | A1 * | 8/2008 | H01M 8/0494 |
| JP | 2005071797 | A | 3/2005 | |
| JP | 2021002904 | A | 1/2021 | |

* cited by examiner

*Primary Examiner* — Kevin M Bernatz
(74) *Attorney, Agent, or Firm* — Dickinson Wright, PLLC

(57) ABSTRACT

A fuel cell system for a load device may include a fuel cell, a battery, and a controller configured to control the fuel cell and the battery. The controller may be configured to: cumulatively calculate first accumulated electric energy generated by the fuel cell; cumulatively calculate a power generation efficiency average at the time of storage of the first accumulated electric energy; calculate required power generation efficiency to generate electric power that meets a power demand of the load device; under a first condition where the power generation efficiency average is lower than the required power generation efficiency, cause the fuel cell to generate electric power that meets the power demand; and under a second condition where the power generation efficiency average is higher, cause the fuel cell to generate electric power at a specific operating point and cause the battery to discharge deficient electric power.

6 Claims, 6 Drawing Sheets

FUEL CELL SYSTEM

REFERENCE TO RELATED APPLICATIONS

This application claims priority from Japanese Patent Application No. 2022-132429 filed on Aug. 23, 2022. The entire content of the priority application is incorporated herein by reference.

TECHNICAL FIELD

Disclosed herein is a fuel cell system.

BACKGROUND ART

Japanese Patent Application Publication No. 2005-71797 describes a fuel cell system in which a fuel cell is stopped when its output is in a low-load region which is a range where power generation efficiency is low (region where a power demand is relatively low) and power is supplied from a charged battery. This technology aims to increase power generation efficiency in the low-load region by activating the fuel cell intermittently.

DESCRIPTION

Operating points determined by currents and voltages output from a fuel cell include a specific operating point at which power generation efficiency is maximized. The power generation efficiency of the fuel cell is lower when the operating point is farther apart from the specific operating point (i.e., closer to the low-load region). Since the technology of Japanese Patent Application Publication No. 2005-71797 does not consider a high-load region where a power demand is high, the power generation efficiency is decreased in the high-load region.

A fuel cell system disclosed herein is for supplying electric power to a load device. The fuel cell system may comprise a fuel cell, a battery, and a controller configured to control the fuel cell and the battery. The fuel cell may be configured to supply generated electric power to the load device and the battery. The battery may be configured to store electric power generated by the fuel cell and discharge stored electric power to the load device. The controller may be configured to: cumulatively calculate first accumulated electric energy, wherein the first accumulated electric energy is electric energy generated by the fuel cell out of an electric energy stored in the battery; cumulatively calculate a power generation efficiency average of the fuel cell at the time of storage of the first accumulated electric energy; calculate required power generation efficiency that is required for the fuel cell to generate electric power that meets a power demand of the load device; under a first condition where the power generation efficiency average is lower than the required power generation efficiency, cause the fuel cell to generate electric power that meets the power demand; and under a second condition where the power generation efficiency average is higher than the required power generation efficiency, cause the fuel cell to generate electric power at a specific operating point at which power generation efficiency is maximized and cause the battery to discharge deficient electric power that is an electric power deficiency relative to the power demand.

The closer the operating point of the fuel cell is to a high-load side relative to the specific operating point, the lower the required power generation efficiency is. Thus, once the power demand of the load device reaches a certain level, the second condition where the power generation efficiency average is higher than the required power generation efficiency may be fulfilled. By causing the fuel cell to operate at the specific operating point under this second condition, the power generation efficiency of the fuel cell can be maximized. Further, the deficient electric power, which is an electric power deficiency relative to the power demand can be compensated by electric power charged by power generation at higher power generation efficiency than the power generation efficiency average of the fuel cell. Since the electric power charged at the high power generation efficiency can be used as supplementary electric power, high power generation efficiency can be achieved in the overall fuel cell system including the charging electric power. The efficiency of the fuel cell system can be increased even in the high-load region.

Figure 1:
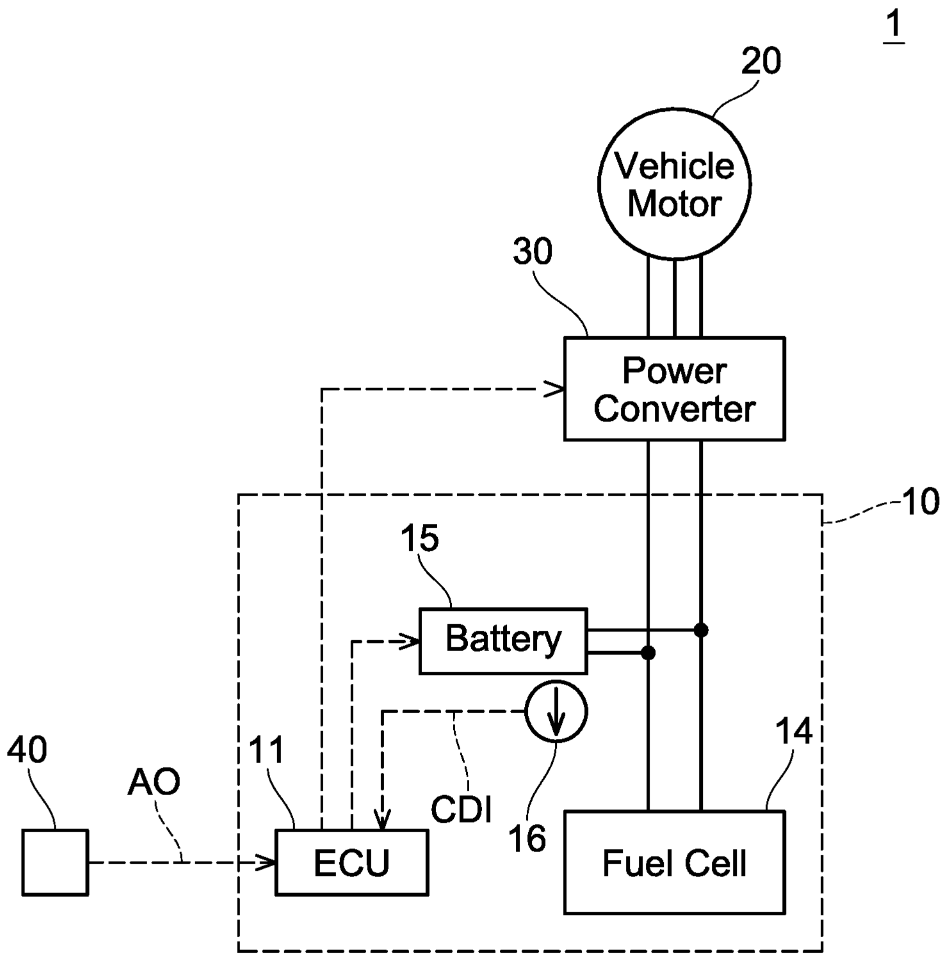
FIG. 1 is a schematic configuration diagram of a part of an electric-powered vehicle 1.

The controller may be further configured to, when the deficient electric power exceeds permissible dischargeable electric power of the battery under the second condition, cause the fuel cell to generate excess electric power that is a difference between the electric power deficiency and the permissible dischargeable electric power, regardless of the specific operating point.

According to this configuration, when the battery cannot completely compensate the deficient electric power, the fuel cell is allowed to generate electric power at an operating point other than the specific operating point. Since the deficient electric power can be compensated by the power generation of the fuel cell, supply of required electric power is ensured.

The controller may be further configured to: cumulatively calculate second accumulated electric energy, wherein the second accumulated electric energy is electric energy that is supplied from a source other than the fuel cell out of the electric energy stored in the battery; and when the second accumulated electric energy is not zero, cause the fuel cell to generate electric power at the specific operating point and cause the battery to discharge the deficient electric power, regardless of a magnitude relationship between the power generation efficiency average and the required power generation efficiency.

The second accumulated electric energy is electric energy accumulated without using the fuel cell. In this configuration, when the second accumulated electric energy is remaining, the second accumulated electric energy can be actively used. Since the usage ratio of the second accumulated electric energy is increased, hourly-average efficiency of the fuel cell system can be increased.

The load device may comprise a motor. The battery may be configured to store regenerative power generated by the motor. The controller may be configured to calculate the first accumulated electric energy based on accumulation of a charging current from the fuel cell and calculate the second accumulated electric energy based on accumulation of a charging current from the motor.

According to this configuration, the electric energy stored in the battery can be virtually divided into the first accumulated electric energy generated by the fuel cell and the second accumulated electric energy generated by the motor. The second accumulated electric energy contributes more significantly to an increase in the efficiency of the fuel cell system than the first accumulated electric energy. Since this second accumulated electric energy can be discerned, the second accumulated electric energy can be actively used.

The power generation efficiency average at a current time may be determined by an equation of: $PA(t)=(PA(t-1)\times SP1(t-1)+GE(dt)\ SP1(dt))/SP1(t)$, where $PA(t)$ is the power generation efficiency average at the current time, $PA(t-1)$ is a power generation efficiency average at a time preceding the current time by a time period dt, $SP1(t)$ is the first accumulated electric energy at the current time, $SP1(t-1)$ is the first accumulated electric energy at the time preceding the current time by the time period dt, $SP1(dt)$ is a change in the first accumulated electric energy over the time period dt, and $GE(dt)$ is power generation efficiency of the fuel cell over the time period dt.

According to this configuration, the power generation efficiency average can be updated sequentially. The power generation efficiency average can be kept updated.

Details of the technology disclosed herein and further improvements will be described in EMBODIMENTS below.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved fuel cell system.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiments

Configuration of Electric-Powered Vehicle 1

FIG. 1 illustrates a schematic configuration diagram of a part of an electric-powered vehicle 1. The electric-powered vehicle 1 comprises a fuel cell system 10, a vehicle motor 20, a power converter 30, and an accelerator position sensor 40. The fuel cell system 10 is a system for supplying electric power to the vehicle motor 20 and various accessories (not illustrated). The fuel cell system 10 comprises an ECU 11, a fuel cell 14, a battery 15, and a current sensor 16.

The fuel cell 14 is connected to the vehicle motor 20 via the power converter 30. Further, the fuel cell 14 is connected to the battery 15. The fuel cell 14 is a power-generating apparatus that generates electric power by electrochemically reacting hydrogen with air. The fuel cell 14 comprises various accessories (e.g., a hydrogen pump, a compressor, valves), which are not illustrated. The fuel cell 14 is configured to supply generated electric power to the vehicle motor 20 and the battery 15.

The battery 15 is a lithium-ion battery. The battery 15 is configured to store electric power generated by the fuel cell 14 and store regenerative power generated by the vehicle motor 20. Further, the battery 15 is configured to discharge stored electric power to the vehicle motor 20. The current sensor 16 detects a charging-discharging current value CDI of the battery 15 and transmits it to the ECU 11. The accelerator position sensor 40 detects an accelerator position AO of an accelerator, which is not illustrated, and transmits the detection result to the ECU 11.

The vehicle motor 20 is an electric motor configured to power the vehicle. The power converter 30 coverts DC voltage supplied from the fuel cell 14 and the battery 15 to three-phase AC voltage and supplies it to the vehicle motor 20. Further, the power converter 30 converts three-phase AC voltage supplied from the vehicle motor 20 by regenerative power generation to DC voltage and supplies it to the battery 15.

The ECU 11 is a computer that integrates and controls various elements of the electric-powered vehicle 1. The ECU 11 comprises a CPU 11*c* and a memory 11*m*. The memory 11*m* stores various control programs, an I-V characteristics map IM and an efficiency map EM, which will be described later, etc. The CPU 11*c* controls an operation of FIGS. 3 and 4, which will be described later, according to the control programs.

Characteristics of Fuel Cell 14

Figure 2:
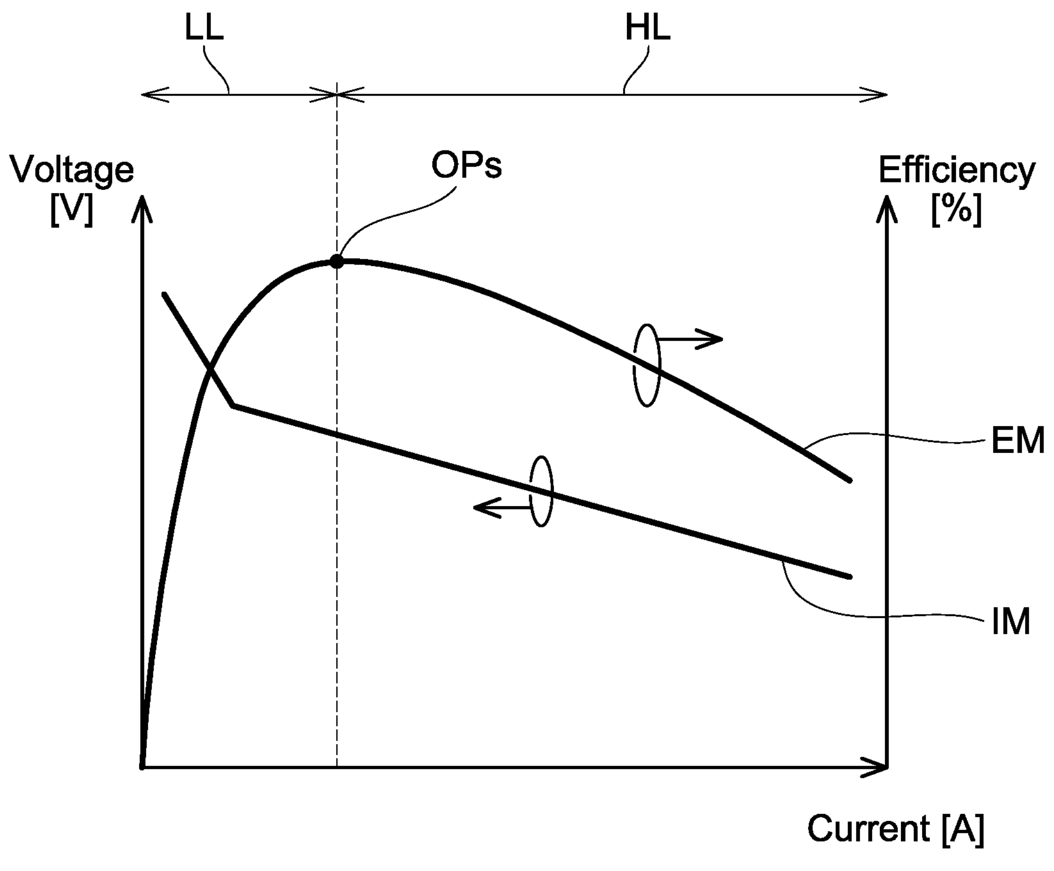
FIG. 2 is a graph for explaining characteristics of a fuel cell 14.

Referring to FIG. 2, characteristics of the fuel cell 14 are described. The I-V characteristics map IM indicates a relationship between current and voltage output from the fuel cell 14. The horizontal axis represents current and the vertical axis represents voltage. Current values along the horizontal axis correspond to vehicle power demands (i.e., power demands of the vehicle motor 20). An efficiency map EM indicates efficiency of the fuel cell 14. The efficiency is a ratio of electric output to enthalpy of inputted fuel. The efficiency of the fuel cell 14 herein means efficiency of the system including the various accessories (e.g., a hydrogen pump, a compressor).

As seen from the efficiency map EM, the fuel cell 14 has a specific operating point OPs at which the power generation efficiency is maximized. Here, a reason why the efficiency is lower in a region LL on a low-load side relative to the specific operating point OPs is described. The accessories of the fuel cell 14 (e.g., an air compressor, a hydrogen pump) consume certain amounts of electric power regardless of the amount of electric power generated. As such, in the region LL, a proportion of the electric power consumed by the accessories is high, and thus the efficiency is low. Next, a reason why the efficiency is lower in a region HL on a high-load side relative to the specific operating point OPs is described. As seen from the I-V characteristics map IM, the voltage value decreases as the current value increases. This is because an internal resistance increases as the current value increases, resulting in a voltage drop. Generally, in fuel cells, it is known that their power generation efficiency is proportionate to their output voltage. Thus, the efficiency of the fuel cell 14 decreases as the current value increases (i.e., as the load increases).

Operation of Fuel Cell System 10

Figure 3:
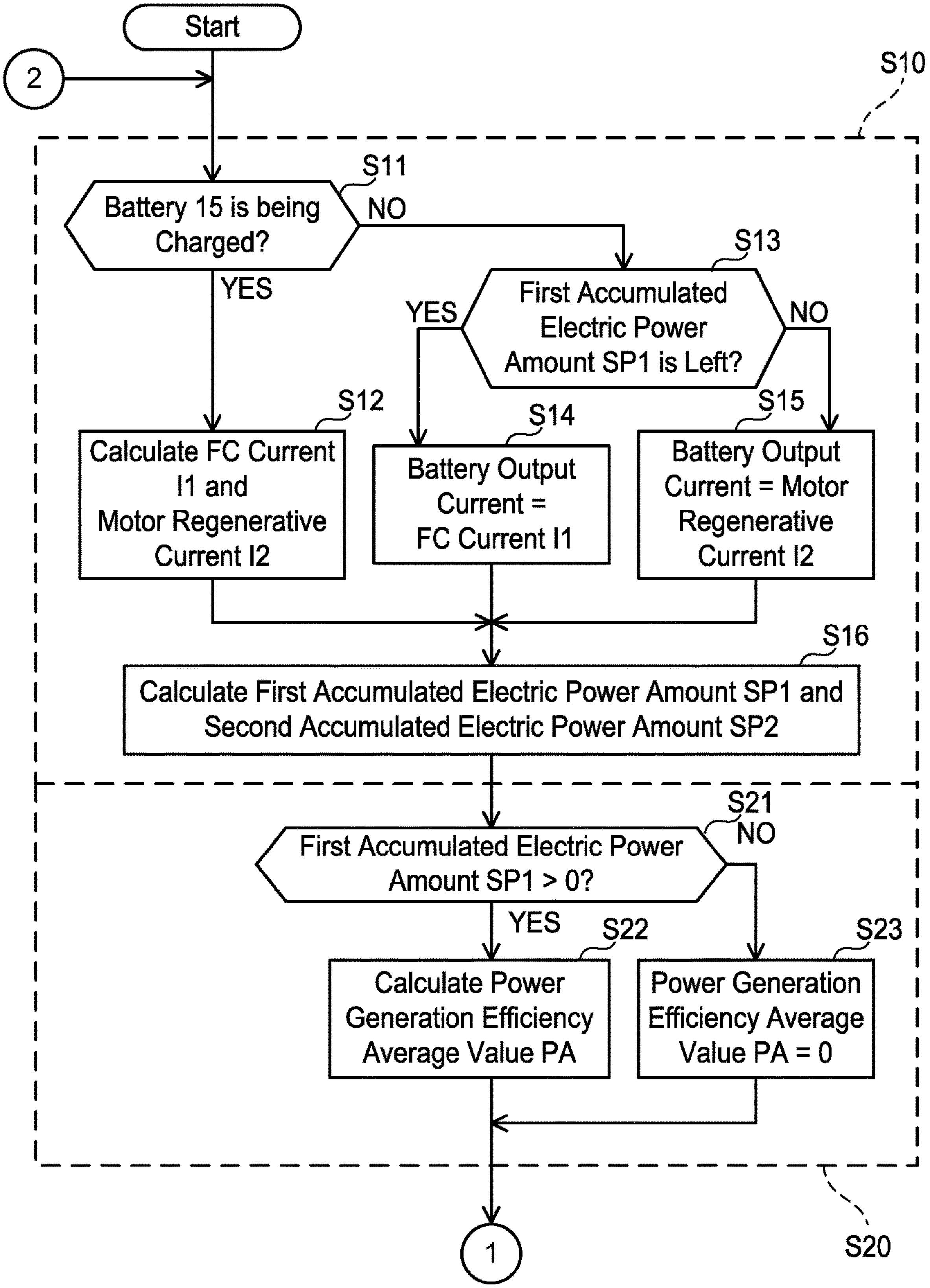
FIG. 3 is a flowchart for explaining an operation of a fuel cell system 10.
Figure 4:
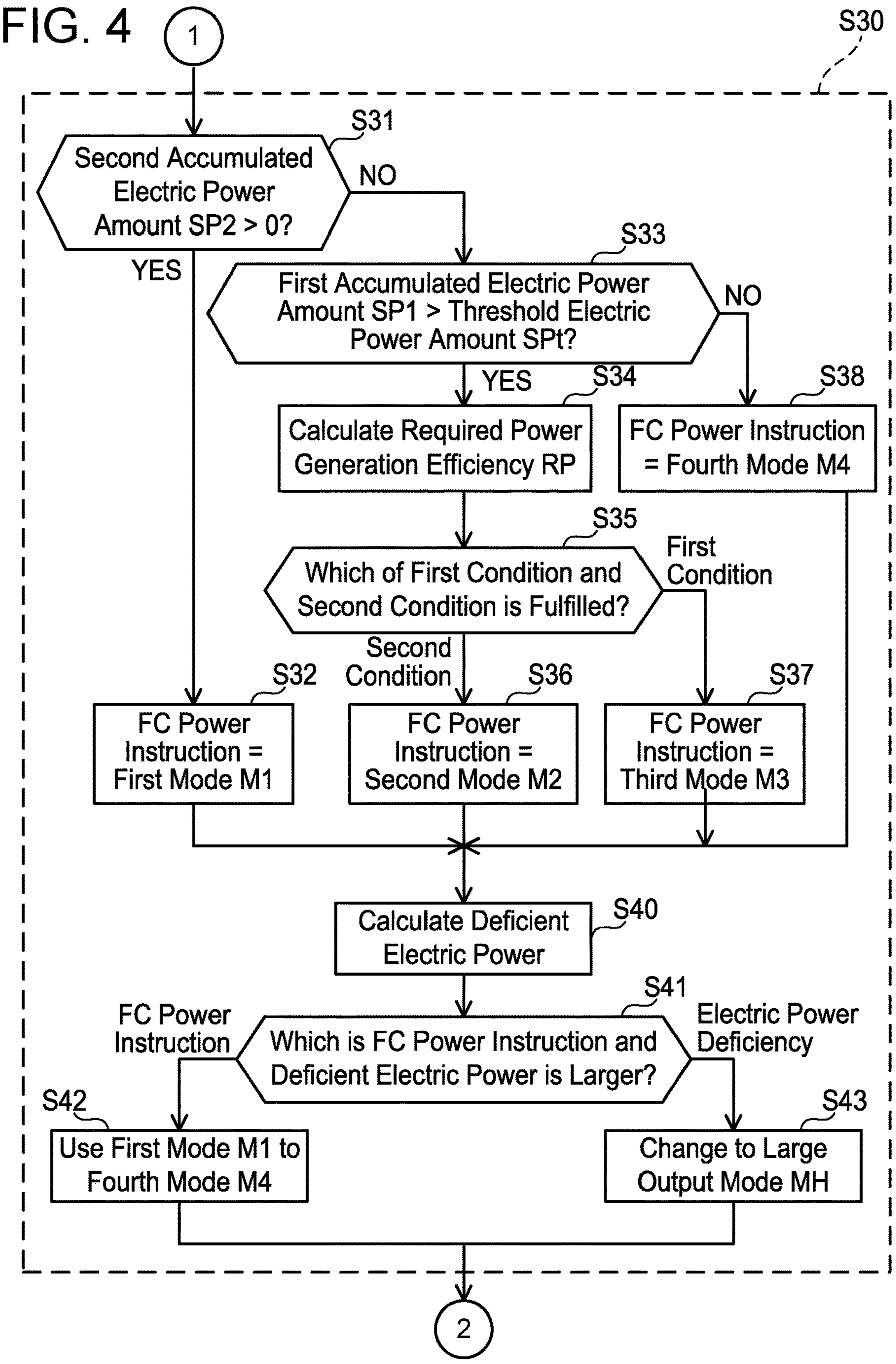
FIG. 4 is a flowchart for explaining the operation of the fuel cell system 10.

Referring to the flowcharts in FIGS. 3 and 4, operation of the fuel cell system 10 is described. Hereinafter, "step 10" will be abbreviated as "S10". The flow in FIGS. 3 and 4 is started in response to the ignition of the electric-powered vehicle 1 being turned on and continues until the ignition is turned off. The flow in FIGS. 3 and 4 may be repeated in predetermined cycles (e.g., 100 ms). The flow in FIGS. 3 and 4 is roughly divided into three steps: S10, S20, and S30. Details will be described below.

Referring to FIG. 3, details of S10 are described. S10 is a step of cumulatively calculating first accumulated electric energy SP1 and second accumulated electric energy SP2. The first accumulated electric energy SP1 is electric energy accumulated by power generation of the fuel cell 14, out of electric energy stored in the battery 15. The second accumulated electric energy SP2 is electric energy accumulated by electric power supplied from a source other than the fuel cell 14, out of the electric energy stored in the battery 15. In the present embodiment, the second accumulated electric energy SP2 is accumulated by regenerative power generation of the vehicle motor 20.

S10 includes S11 to S16. In S11, the ECU 11 determines whether the battery 15 is being charged or not. In case of affirmative judgement (S11: Yes), the flow proceeds to S12. In S12, the ECU 11 calculates an FC current I1 and a motor regenerative current I2. Charging current to the battery 15 is virtually divided into the FC current I1 and the motor regenerative current I2. The motor regenerative current I2 is a current generated by regenerative power generation of the vehicle motor 20. To be accurate, the motor regenerative current I2 may be calculated by subtracting a current consumed in the accessories from the current generated by the regenerative power generation of the vehicle motor 20. The FC current I1 is a current generated by power generation of the fuel cell 14. The FC current I1 may be calculated by subtracting the motor regenerative current I2 from the charging-discharging current value CDI measured by the current sensor 16.

In case where it is determined that the battery 15 is not being charged in S11 (S11: No), the flow proceeds to S13. In S13, the ECU 11 determines whether the first accumulated electric energy SP1 is remaining or not. A remaining amount of the first accumulated electric energy SP1 can be calculated in S16, which will be described later. In case of affirmative judgement (S13: Yes), the flow proceeds to S14, and the current output from the battery 15 is categorized as the FC current I1. Specifically, the charging-discharging current value CDI detected by the current sensor 16 is regarded as the FC current I1.

In case where the first accumulated electric energy SP1 is not remaining (S13: No), the flow proceeds to S15. In this instance, the current output from the battery 15 is categorized as the motor regenerative current I2. Specifically, the charging-discharging current value CDI detected by the current sensor 16 is regarded as the motor regenerative current I2.

In S16, the ECU 11 calculates the first accumulated electric energy SP1 and the second accumulated electric energy SP2. Specifically, a first accumulated electric energy SP1(t) at the current time is calculated by the following equation (1), where SP1(t−1) is a first accumulated electric energy at a time preceding the current time by a time period dt, and I1 is the FC current during the time period dt.

$$SP1(t)=SP1(t-1)+(-I1\times dt) \quad \text{Equation (1):}$$

Regarding the sign of the FC current I1, the negative sign indicates charge, while the positive sign indicates discharge. Further, the time period dt is, for example, a time period in which the flow in FIGS. 3 and 4 is performed once. That is, the first accumulated electric energy SP1 can be calculated based on accumulation of charging current from the fuel cell 14 performed every time period dt. Here, the unit for the first accumulated electric energy SP1 is [C(═As)].

Similarly, a second accumulated electric energy SP2(t) at the current time is calculated by the following equation (2).

$$SP2(t)=SP2(t-1)+(-I2\times dt) \quad \text{Equation (2):}$$

That is, the second accumulated electric energy SP2 can be calculated based on accumulation of charging current from the vehicle motor 20 performed every time period dt.

Referring to FIG. 3, details of S20 are described. S20 is a step of cumulatively calculating a power generation efficiency average PA. The power generation efficiency average PA is an average of power generation efficiencies of the fuel cell 14 when electric power is added to the first accumulated electric energy SP1.

S20 includes S21 to S23. In S21, the ECU 11 determines whether the first accumulated electric energy SP1 is more than zero or not. In case where it is determined that the first accumulated electric energy SP1 is equal to or less than zero (S21: No), the flow proceeds to S23 and the ECU 11 sets the power generation efficiency average PA to zero.

In case where it is determined that the first accumulated electric energy SP1 is remaining (S21: Yes), the flow proceeds to S22. In S22, the ECU 11 calculates the power generation efficiency average PA. Specifically, a power generation efficiency average PA(t) at the current time can be calculated from the following equation (3), where PA(t−1) is a power generation efficiency average at the time preceding the current time by the time period dt, SP1(t) is a first accumulated electric energy at the current time, SP1(t−1) is a first accumulated electric energy at the time preceding the current time by the time period dt, SP1(dt) is a change in the first accumulated electric energy over the time period dt, GE(dt) is power generation efficiency of the fuel cell 14 over the time period dt, and CE(dt) is charging efficiency of the battery 15 over the time period dt.

$$PA(t)=(PA(t-1)\times SP1(t-1)+GE(dt)\times CE(dt)\times SP1(dt))/SP1(t) \quad \text{Equation (3):}$$

With this calculation, the power generation efficiency average PA can be updated sequentially. The power generation efficiency average PA can be kept updated. The charging efficiency CE(dt) may be omitted. Further, calculated values or measured values may be used for the power generation efficiency GE(dt) and the charging efficiency CE(dt).

Referring to FIG. 4, details of S30 are described. S30 is a step of creating an FC power instruction which is information for instructing the fuel cell 14 on how much electrical power it should generate.

S30 includes S31 to S43. In S31, the ECU 11 determines whether the second accumulated electric energy SP2 is more than zero or not. In case where it is determined that the second accumulated electric energy SP2 is remaining (S31: Yes), the flow proceeds to S32. In S32, the ECU 11 sets the FC power instruction to a first mode M1. The flow then proceeds to S40. The first mode M1 is a mode for causing the fuel cell 14 to generate electric power at a fixed generation amount OPa. Under the first mode M1, if the fixed generation amount OPa is short relative to a required energy of the vehicle motor 20, deficient electric power corresponding to this deficiency is discharged from the battery 15, whereas if the fixed generation amount OPa is more than the required energy, the excess electric power is charged to the battery 15. That is, under the first mode M1, an instruction to generate electric power in a smaller amount than the fixed generation amount OPa is not given. The fixed generation amount OPa is larger than the amount of electric power generated at the specific operating point OPs by an additional amount of electric energy, which is determined according to an average load of the system. The operating point at which the fixed generation amount OPa is generated is close to the specific operating point OPs, and thus it is possible to prevent an electric power shortage in the overall system while keeping the power generation efficiency almost at the maximum. Additional electric energy as aforementioned may be determined according to characteristics of the system as needed. Further, under the first mode M1, a magnitude of the power generation efficiency average PA is not compared with a magnitude of a required power generation efficiency RP.

In case where it is determined in S31 that the second accumulated electric energy SP2 is not remaining (S31: No), the flow proceeds to S33. In S33, the ECU 11 determines whether the first accumulated electric energy SP1 is more than threshold electric energy SPt or not. The threshold electric energy SPt may be set based on the lowest value of SOC of the battery 15. In case of affirmative judgement (S33: Yes), it is determined that the first accumulated electric energy SP1 is sufficiently remaining and the flow proceeds to S34.

In S34, the ECU 11 calculates a required power generation efficiency RP. The required power generation efficiency RP is power generation efficiency of the fuel cell 14 that is required to generate electric power meeting a power demand of the vehicle motor 20 by the fuel cell 14. That is, it is power generation efficiency that is required to meet the power demand only by the fuel cell 14 without power supply from the battery 15.

Figure 5:
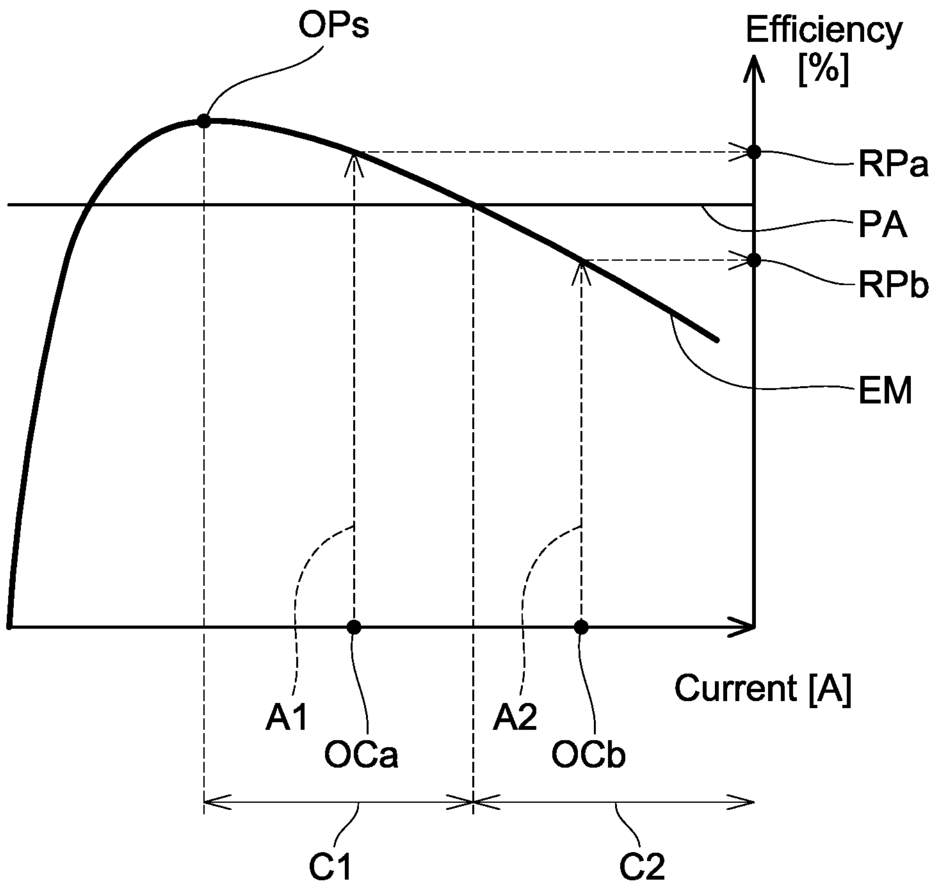
FIG. 5 is a graph for explaining how to find required power generation efficiency RP.

Referring to FIG. 5, how to find the required power generation efficiency RP is specifically described. An efficiency map EM in FIG. 5 is the same as the efficiency map EM already described in connection with FIG. 2. How much the accelerator pedal is manipulated by a driver (accelerator position) is detected by the accelerator position sensor 40. The ECU 11 calculates the power demand of the vehicle motor 20 based on the detected accelerator position. Further, the ECU 11 calculates an output current OC corresponding to the power demand. The ECU 11 then refers to the efficiency map EM to find the required power generation efficiency RP corresponding to the output current OC. For example, when an output current OCa is calculated, a required power generation efficiency RPa is found according to the efficiency map EM (see arrow A1). When an output current OCb is calculated, a required power generation efficiency RPb is found according to the efficiency map EM (see arrow A2).

In S35, the ECU 11 determines which of a first condition and a second condition is fulfilled. The first condition is a condition where "the power generation efficiency average PA (S22) is lower than the required power generation efficiency RP (S34)". The second condition is a condition where "the power generation efficiency average PA (S22) is higher than the required power generation efficiency RP (S34)".

This determination can be made using the efficiency map EM shown in FIG. 5. Details are described. The power generation efficiency average PA is plotted on the efficiency map EM. Then, the power generation efficiency average PA is compared with the required power generation efficiency RP. For example, in case where the required power generation efficiency is RPa, the power generation efficiency average PA is lower than the required power generation efficiency RPa, and thus it is determined that the first condition is fulfilled. On the other hand, in case where the required power generation efficiency is RPb, the power generation efficiency average PA is higher than the required power generation efficiency RPb, and thus it is determined that the second condition is fulfilled.

FIG. 5 shows a current region C1 where the first condition is fulfilled and a current region C2 where the second condition is fulfilled. In the current region C1 where the first condition is fulfilled, the load is relatively small and a decrease in the efficiency of the fuel cell 14 is small. Therefore, under the first condition, the efficiency of the overall fuel cell system 10 is increased by supplying the entire required electric power only by the fuel cell 14 rather than by supplying the electric power stored in the battery 15. On the other hand, in the current region C2 where the second condition is fulfilled, the load is relatively large and thus a decrease in the efficiency of the fuel cell 14 is large. Therefore, under the second condition, the efficiency of the overall fuel cell system 10 is increased by causing the fuel cell 14 to generate electric power at the fixed generation amount OPa and compensating the deficient electric power by the electric power stored in the battery 15 rather than by supplying the entire required electric power only by the fuel cell 14.

In case where it is determined that the second condition is fulfilled in S35 (S35: Second Condition), the flow proceeds to S36. In S36, the ECU 11 sets the FC power instruction to a second mode M2. Then, the flow proceeds to S40. The second mode M2 is a mode for causing the fuel cell 14 to generate electric power at the fixed generation amount OPa. Under the second mode M2, in case where the fixed generation amount OPa is short relative to the required energy of the vehicle motor 20, the deficient electric power corresponding to this deficiency is discharged from the battery 15, whereas in case where the fixed generation amount OPa is larger than the required energy, the excess electric power is charged to the battery 15. That is, under the second mode M2, an instruction to generate electric power in a smaller amount than the fixed generation amount OPa is not given.

In case where it is determined that the first condition is fulfilled (S35: First Condition), the flow proceeds to S37. In S37, the ECU 11 sets the FC power instruction to a third mode M3. Then, the flow proceeds to S40. The third mode M3 is a mode for causing the fuel cell 14 to generate electric power that meets the power demand of the vehicle 20.

In case where it is determined in S33 that the first accumulated electric energy SP1 is smaller than the threshold electric energy SPt (S33: No), the flow proceeds to S38. In S38, the ECU 11 sets the FC power instruction to a fourth mode M4. Then, the flow proceeds to S40. The fourth mode M4 is a mode for causing the fuel cell 14 to generate electric power at a constant load with an output according to the SOC remaining in the battery 15. The first accumulated electric energy SP1 can thereby be increased under the fourth mode M4.

In S40, the ECU 11 calculates deficient electric power by subtracting permissible dischargeable electric power of the battery 15 from the power demand of the vehicle motor 20. In S41, the ECU 11 determines which of electric power generated by the fuel cell 14 according to the FC power instruction set at one of the first mode M1 to the fourth mode M4 and the deficient electric power calculated in S40 is larger. In case where the electric power generated by the fuel cell 14 according to the FC power instruction set at one of the first mode M1 to the fourth mode M4 is larger (S41: FC Power Instruction), it is determined that the deficient electric power can be covered by electric power generated by the fuel cell 14, and the flow proceeds to S42. In S42, the ECU 11 controls the fuel cell 14 according to the FC power instruction at one of the first mode M1 to the fourth mode M4.

Figure 6:
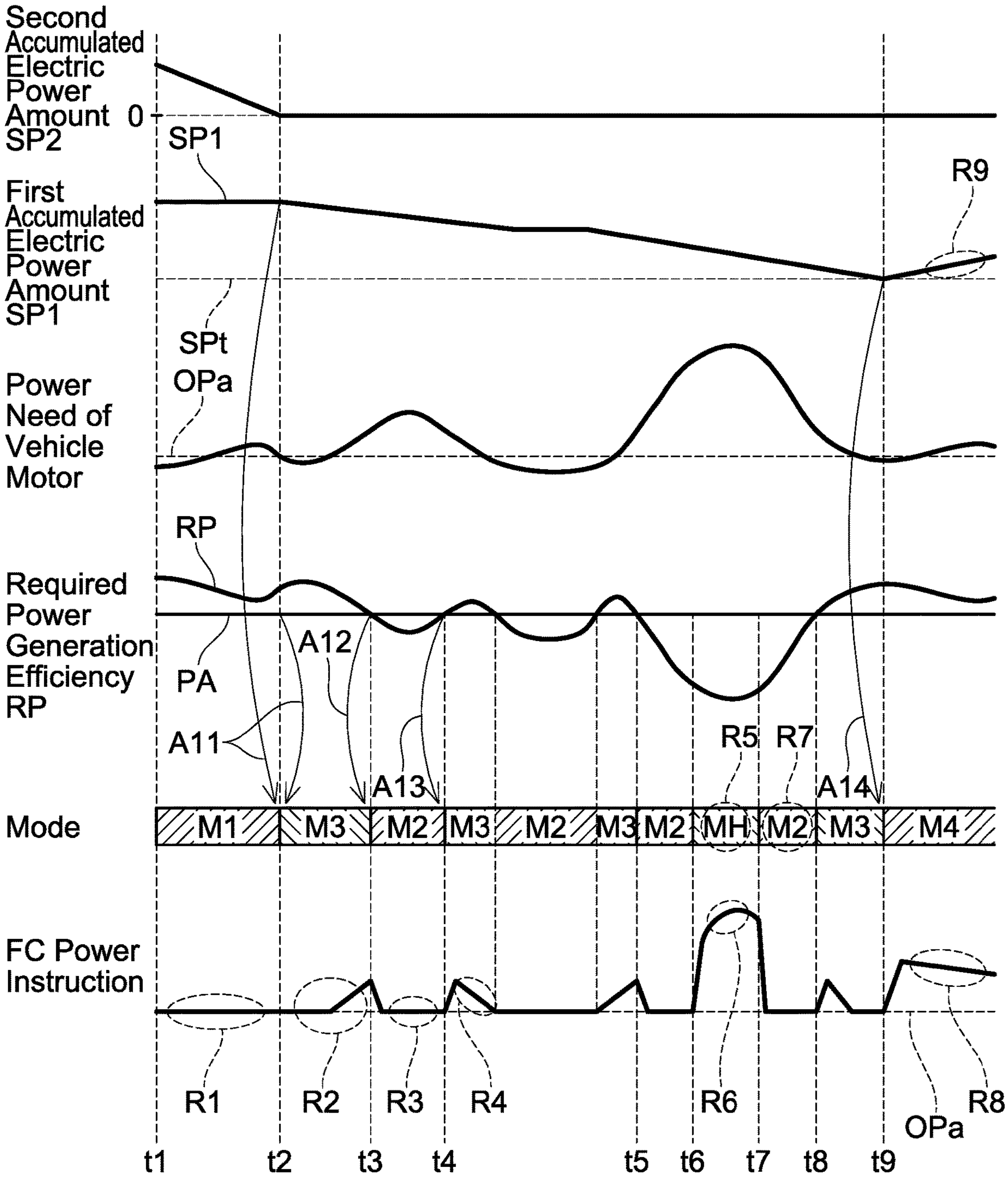
FIG. 6 is a time chart for explaining an example of specific operation of the fuel cell system 10.

In case where the deficient electric power is larger (S41: Electric Power Deficiency), the flow proceeds to S43. In S43, the ECU 11 changes the FC power instruction to a large output mode MH. The large output mode MH is a mode for controlling the fuel cell 14 according to the power demand of the vehicle motor 20. In this way, when the deficient electric power, which is an electric power deficiency relative to the power demand exceeds the permissible dischargeable electric power of the battery 15 under the second condition, the fuel cell 14 is allowed to generate electric power at an amount other than the fixed generation amount OPa. Since excess electric power, which corresponds to a difference between the deficient electric power and the permissible dischargeable electric power, can be generated by the fuel cell 14, supply of the required electric power can be ensured. The flow then returns to S10 to repeat itself Example of Specific Operation Referring to the time chart in FIG. 6, an example of a specific operation of the fuel cell system 10 is described. The horizontal axis represents time. The following description is for a case where the second accumulated electric energy SP2 is larger than zero at time t1 (S31: Yes). Since the fuel cell system 10 operates under the first mode M1 in this case, the FC power instruction is an instruction for causing the fuel cell 14 to generate electric power at the fixed generation amount OPa (see region R1).

When the second accumulated electric energy SP2 becomes zero at time t2 (S31: No), the mode is switched to the third mode M3 (see arrows A11) since the first accumulated electric energy SP1 is larger than the threshold electric energy SPt (S33: Yes) and the power generation efficiency average PA is lower than the required power generation efficiency RP (S35: First Condition). Thus, electric power generated by the fuel cell 14 is supplied to the vehicle motor 20 (see region R2).

When the second condition, where the power generation efficiency average PA is higher than the required power generation efficiency RP, is fulfilled at time t3 (S35: Second Condition), the mode is switched to the second mode M2 (see arrow A12). Thus, the FC power instruction is set to an instruction for causing the fuel cell 14 to generate electric power in the fixed generation amount OPa (see region R3).

When the first condition, where the power generation efficiency average PA is lower than the required power generation efficiency RP, is fulfilled at time t4 (S35: First Condition), the mode is switched to the third mode M3 again (see arrow A13). Thus, electric power generated by the fuel cell 14 is supplied to the vehicle motor 20 (see region R4).

When the deficient electric power exceeds electric power generated under the second mode M2 at time t6 (S41: Electric Power Deficiency), the mode is changed from the second mode M2 to the large output mode MH (see S43, region R5). Thus, the deficient electric power is compensated by the electric power generated by the fuel cell 14 (see region R6). When the deficient electric power becomes smaller than electric power generated under the second mode M2 at time t7, the mode returns to the second mode M2 (see region R7).

When the second accumulated electric energy SP2 becomes smaller than the threshold electric energy SPt at time t9 (S33: No), the mode is switched to the fourth mode M4 (see arrow A14). The FC power instruction is set to an instruction to cause the fuel cell 14 to generate constant power according to the SOC of the battery 15 (see region R8). Thus, the first accumulated electric energy SP1 increases (see region R9).

Effects

In conventional fuel cell systems, how much electric power should be generated by a fuel cell is determined based on electric power required for a vehicle (e.g., electric power required for the vehicle motor 20, electric power required for the accessories). This has difficulty in improving the efficiency because an operating point of the fuel cell is spontaneously determined and it is impossible to control a time period for which the fuel cell operates at a specific operating point with high efficiency. According to the technology disclosed herein, the efficiency when electric power stored in the battery 15 is used and the efficiency when electric power generated by the fuel cell 14 is directly used are compared with each other by comparing the power generation efficiency average PA and the required power generation efficiency RP with each other (S35). In case where it is more efficient to use electric power stored in the battery 15 (S35: Second Condition), the fuel cell 14 is caused to generate electric power in the fixed generation amount OPa to allow for maximization of a time period for which the fuel cell 14 operates at an operating point close to the specific operating point OPs. Further, since electric power charged in the battery 15 with high power generation efficiency can be used as supplemental electric power, high power generation efficiency can be achieved for the overall fuel cell system 10 including charging electric power.

With the technology disclosed herein, the power generation efficiency average PA, which is compared to the required power generation efficiency RP, can be cumulatively calculated (S22). Thus, the determination on whether it is more efficient to use the electric power stored in the battery 15 or not can be made following the change(s) in the state of the fuel cell system 10. This allows for feedback control with a long response time, and thus the efficiency of the overall fuel cell system 10 can be further increased.

With the technology disclosed herein, the electric energy stored in the battery 15 can be virtually divided into the first accumulated electric energy SP1 and the second accumulated electric energy SP2 (S10). The second accumulated electric energy SP2 generated by the vehicle motor contributes more significantly to an increase in the efficiency of the fuel cell system 10 than the first accumulated electric energy SP1 generated by the fuel cell 14. By discerning this second accumulated electric energy SP2, the second accumulated electric energy SP2 can be actively used when it is remaining (S31: Yes). Since the usage ratio of the second accumulated electric energy SP2 can be increased, the hourly-average efficiency of the fuel cell system 10 can be increased.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

MODIFICATIONS

The application of the fuel cell system 10 according to the technology disclosed herein is not limited to the electric-powered vehicle 1 and may be extended to a variety of fields. For example, the fuel cell system 10 may be applied to a stationary power source. In this case, the second accumulated electric energy SP2 may be electric power generated by solar power generation and/or an electric power system. Further, for example, the fuel cell system 10 may be applied to a variety of movable objects such as a train, a ship, etc.

The I-V characteristics map IM and the efficiency map EM stored in the memory 11*m* may be updated as needed. This allows for learning of degradation of the fuel cell 14. The required power generation efficiency RP can be accurately calculated.

What is claimed is:

1. A fuel cell system for supplying electric power to a load device, the fuel cell system comprising:

a fuel cell;

a battery; and a controller configured to control the fuel cell and the battery, wherein the fuel cell is configured to supply generated electric power to the load device and the battery, the battery is configured to store electric power generated by the fuel cell and discharge stored electric power to the load device, a power generation efficiency average at a current time is calculated by an equation of: $PA(t)=(PA(t-1)\times SP1(t-1)+GE(dt)\times SP1(dt))/SP1(t)$, where PA(t) is the power generation efficiency average at the current time, PA(t−1) is the power generation efficiency average at a time preceding the current time by a time period dt, SP1(t) is the first accumulated electric energy at the current time, SP1(t−1) is the first accumulated electric energy at the time preceding the current time by the time period dt, SP1(dt) is a change in the first accumulated electric energy over the time period dt, and GE(dt) is power generation efficiency of the fuel cell over the time period dt, the controller is configured to:

cumulatively calculate first accumulated electric energy, wherein the first accumulated electric energy is electric energy generated by the fuel cell out of electric energy stored in the battery;

cumulatively calculate the power generation efficiency average of the fuel cell at the time of storage of the first accumulated electric energy;

calculate required power generation efficiency that is required for the fuel cell to generate electric power that meets a power demand of the load device;

under a first condition where the power generation efficiency average is lower than the required power generation efficiency, cause the fuel cell to generate electric power that meets the power demand; and under a second condition where the power generation efficiency average is higher than the required power generation efficiency, cause the fuel cell to generate electric power at a specific operating point at which power generation efficiency is maximized and cause the battery to discharge deficient electric power that is an electric power deficiency relative to the power demand, wherein the specific operating point at which power generation efficiency is maximized is the operating point, as determined via an I-V plot, having the maximum efficiency of the entire fuel cell system based on the ratio of electric output to enthalpy of an inputted fuel.

2. The fuel cell system according to claim 1, wherein the controller is further configured to, when the deficient electric power exceeds permissible dischargeable electric power of the battery under the second condition, cause the fuel cell to generate excess electric power that is a difference between the electric power deficiency and the permissible dischargeable electric power regardless of the specific operating point.

3. The fuel cell system according to claim 1, wherein the controller is further configured to:

cumulatively calculate second accumulated electric energy, wherein the second accumulated electric energy is electric energy that is supplied from a source other than the fuel cell, out of the electric energy stored in the battery; and when the second accumulated electric energy is not zero, cause the fuel cell to generate electric power at the specific operating point and cause the battery to discharge the deficient electric power regardless of a magnitude relationship between the power generation efficiency average and the required power generation efficiency.

4. The fuel cell system according to claim 3, wherein the load device comprises a motor, the battery is configured to store regenerative power generated by the motor, and the controller is configured to calculate the first accumulated electric energy based on accumulation of a charging current from the fuel cell and calculate the second accumulated electric energy based on accumulation of a charging current from the motor.

5. The fuel cell system according to claim 2, wherein the controller is further configured to:

cumulatively calculate second accumulated electric energy, wherein the second accumulated electric energy is electric energy that is supplied from a source other than the fuel cell, out of the electric energy stored in the battery; and when the second accumulated electric energy is not zero, cause the fuel cell to generate electric power at the specific operating point and cause the battery to discharge the deficient electric power, regardless of a magnitude relationship between the power generation efficiency average and the required power generation efficiency.

6. The fuel cell system according to claim 5, wherein the load device comprises a motor, the battery is configured to store regenerative power generated by the motor, and the controller is configured to calculate the first accumulated electric energy based on accumulation of a charging current from the fuel cell and calculate the second accumulated electric energy based on accumulation of a charging current from the motor.

* * * * *